Dec. 5, 1950

W. D. HOUGHTON 2,532,843

PULSE SELECTIVE SYSTEM

Filed Sept. 10, 1945

2 Sheets-Sheet 1

INVENTOR
WILLIAM D. HOUGHTON.
BY H. S. Grover
ATTORNEY

INVENTOR
WILLIAM D. HOUGHTON.
BY H. S. Grover
ATTORNEY

Patented Dec. 5, 1950 2,532,843

UNITED STATES PATENT OFFICE 2,532,843

PULSE SELECTIVE SYSTEM

William D. Houghton, Port Jefferson, N. Y., assignor to Radio Corporation of America, a corporation of Delaware Application September 10, 1945, Serial No. 615,352

3 Claims. (Cl. 250—27)

This invention comprises a pulse selective system for distinguishing between pulses of equal length which are more closely spaced in time and other pulses which are not so closely spaced in time, and also for distinguishing between pulses of different lengths. The invention may be called a pulse separator circuit because it selects from a group of recurring pulses only those adjacent pulses whose time spacing is shorter than a predetermined interval. The invention also selects from a group of recurring pulses only those whose duration is longer than a predetermined interval.

The invention can be used at the receiving end of a time division multiplex communication system. In such a system it is customary to generate short pulses of radio frequency energy and to transmit these pulses at constant amplitude and at a fixed average repetition rate. The pulses in the different channels are transmitted consecutively. These pulses may have their occurrence time or phase modulated within predetermined limits. Thus, a pulse occurs from each channel once for each cycle of operation or synchronizing period, and this pulse is advanced or retarded from its normal time of occurrence by an amount proportional to the instantaneous amplitude of the modulation. During each cycle of operation or synchronizing period, there are transmitted pulses from all of the channels followed by a synchronizing pulse of longer duration than the channel pulses or by two or more synchronizing pulses more closely spaced in time than the consecutively occurring channel pulses. By way of example only, let it be assumed that there are eight channels. Then, during each cycle of operation or synchronizing period, there will occur eight constant amplitude pulses (one from each channel) followed either by a longer duration synchronizing pulse or by the more closely spaced synchronizing pulses, depending upon the type of system employed. This cycle of operation then repeats itself continuously at the synchronization period.

Figure 1A:
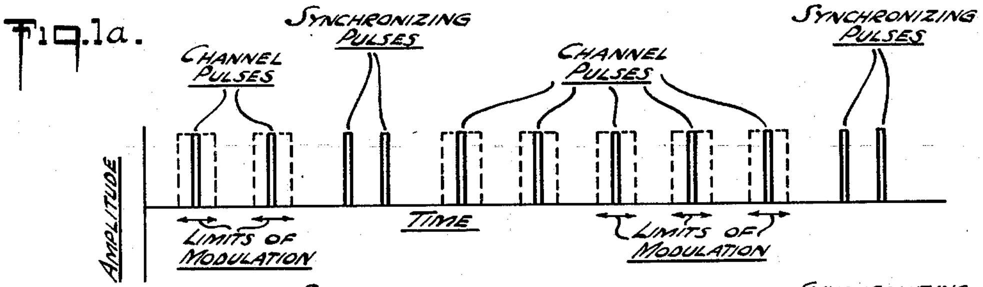
Figure 1B:
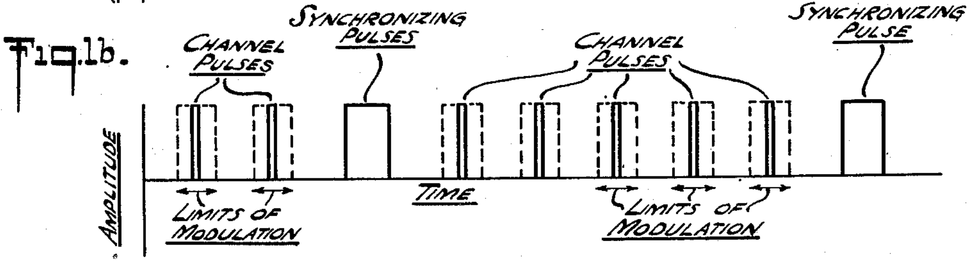

In the time division multiplex system, when two synchronizing pulses are transmitted after the channel pulses, these synchronizing pulses are more closely spaced in time than any two adjacent channel pulses during the extremes of modulation. Fig. 1*a* graphically illustrates the appearance of the channel pulses and synchronizing pulses for a five channel time division multiplex system, when a pair of synchronizing pulses are transmitted for each cycle of operation or synchronizing period. Fig. 1*b* graphically illustrates the appearance of these pulses when a single synchronizing pulse of a longer duration than the channel pulses is employed for each cycle of operation.

At the receiving end of the time division multiplex system, it is necessary to provide a circuit for distinguishing between the channel pulses and the synchronizing pulses. The present invention is a pulse selective system which achieves this purpose and enables the utilization of the synchronizing pulses.

Figure 2:
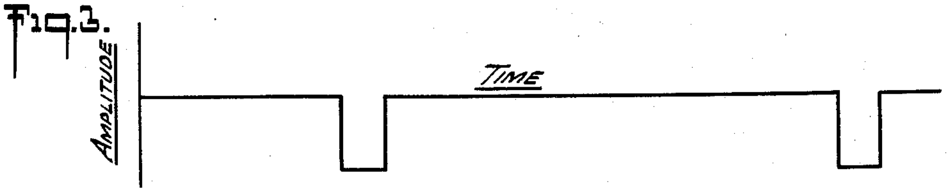
Figure 4:
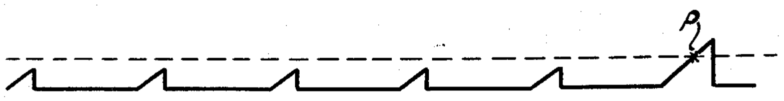
Figure 2:
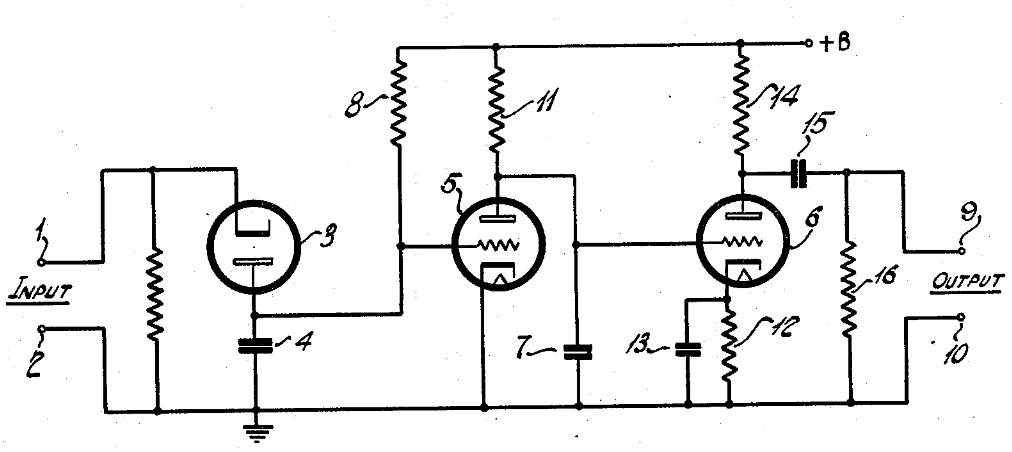
Figure 2A:
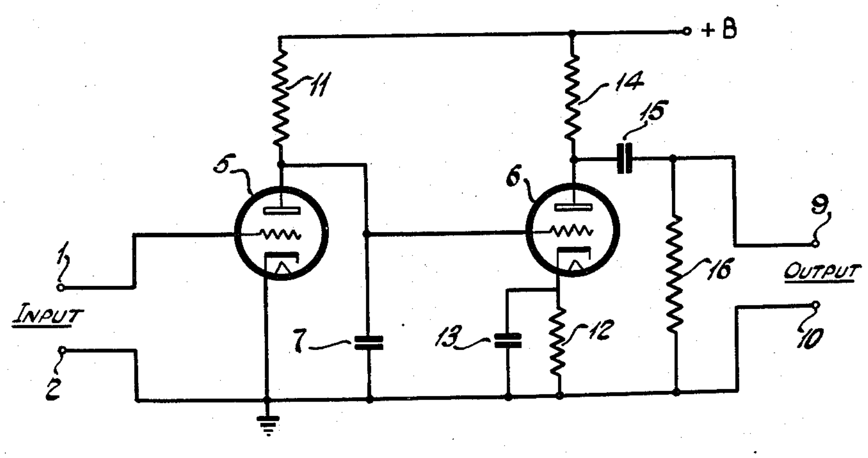

A description of the invention follows in conjunction with a drawing, in which:

Figs. 1*a* and 1*b* graphically illustrate pulses transmitted by multiplex communication systems employing two different types of synchronizing pulses;

Fig. 2 is a schematic circuit diagram of one embodiment of the invention for distinguishing between spaced channel pulses and more closely spaced synchronizing pulses;

Fig. 2*a* is a modification of the circuit of Fig. 2 for use in distinguishing between spaced channel pulses and a longer duration synchronizing pulse;

Fig. 3 is a graphical representation of the pulses produced by the circuits of Fig. 2 and Fig. 2*a*; and Fig. 4 is a graphical representation of saw-tooth waves generated in the circuits of Figs. 2 and 2*a*, and is given in explanation of the operation of the invention.

Referring to Fig. 2 of the drawing, the pulse selective circuit of the invention comprises input terminals 1 and 2 to which the incoming pulses are applied, output terminals 9 and 10 from which a pulse of desired length and polarity is derived, and between these input and output terminals a vacuum tube diode 3 whose cathode is connected to terminal 1 and whose anode is connected to ground through a condenser 4, a vacuum tube triode 5 normally biased to be conductive and controlled by the charge on condenser 4, and a vacuum tube triode 6 normally biased to cut-off under control of the charge built up on condenser 7.

It is assumed that the pulses applied to terminals 1 and 2 are video (direct current) pulses of negative polarity and of such magnitude that the cathode of diode 3 is driven negative a sufficient amount to cause it to become conductive. If Fig. 2 is employed at the receiving end of a time division multiplex radio communication system, the received pulses of radio frequency energy are first detected and limited so as to produce the video (direct current) pulses of constant amplitude to be applied to the input terminals. Diode V3 becomes conductive each time a negative impulse is impressed on its cathode, as a result of which condenser 4 becomes charged negatively.

The negative charge on condenser 4 is applied to the grid of normally conductive tube 5 and is sufficient to bias this tube to the anode current cut-off condition. The charge on condenser 4 then leaks off through resistor 8 until the voltage on the grid of tube 5 reaches a point sufficient to cause anode current to flow, at which time tube 5 again becomes conductive and provides a very low impedance path for condenser 4.

The time constant of resistor 8 and condenser 4 is such that the charge on condenser 4 reaches zero in the interval between incoming channel pulses but does not leak off sufficiently between the closely occurring synchronizing pulses (note Fig. 1*a*) to permit anode current to flow in tube 5. It will then be seen that anode current in tube 5 is cut off for a longer interval of time when closely spaced synchronizing pulses are present than when more widely spaced channel pulses are present.

When the current in tube 5 is cut off by the voltage charge on condenser 4, the voltage on the anode of tube 5 rises, as a result of which a positive charge through resistor 11 builds up on condenser 7 located in the anode circuit of tube 5. The values of resistor 11 and condenser 7 are so proportioned that the charge on 7 inreases linearly. During the presence of synchronizing pulses, the charge on condenser 7 reaches a higher value than during the presence of channel pulses, because tube 5 is cut off for a longer period of time when the synchronizing pulses occur. When tube 5 becomes conductive the charge on condenser 7 rapidly dissipates. The wave form developed on condenser 7 is a saw-tooth and the result of the foregoing operation is a plurality of saw-tooth waves, as represented in Fig. 4. The smaller saw-tooth waves occur when channel pulses are present, while the larger amplitude saw-tooth waves occur when the synchronizing pulses are present.

Tube 6 is normally biased to the anode current cut-off condition by resistor 12 which controls the bias on this tube. Condenser 13 is a cathode by-pass capacitor for alternating current components. The value of the cut-off bias on tube 6 is so adjusted that tube 6 conducts only when synchronizing pulses are present. Referring to Fig. 4 again, the horizontal dash line represents the value which must be reached by the saw-tooth wave developed on condenser 7 before tube 6 conducts. Point P on the larger saw-tooth wave indicates the value sufficient to overcome the cut-off bias and cause anode current to flow in tube 6. Tube 6 does not conduct during the presence of channel pulses.

When tube 6 conducts, there is a decrease in voltage on the anode of this tube, due to the IR drop in resistor 14. This decrease in voltage produces a negative pulse which is passed through output coupling condenser 15 to output terminal 9. This negative pulse is developed across resistor 16 and is available for utilization at output terminals 9 and 10. The value of resistor 16 is not critical. This negative pulse is shown in Fig. 3 and is used in the time division multiplex system to synchronize the receiving channel selectors (not shown). The cut off to limiting region of tube 6 is small compared to the amplitude of the applied saw-tooth; hence the output pulse is flat-topped, as shown.

From the foregoing, it will be observed that I have shown a circuit for selecting from recurring relatively widely spaced short pulses two more closely spaced short pulses, and for generating a single pulse therefrom.

In the event the channel pulses and synchronizing pulses occur as shown in Fig. 1*b*, wherein only a single longer duration synchronizing pulse is used for each cycle of operation, the circuit of Fig. 2 would still operate satisfactorily. If desired, the circuit of Fig. 2 might be reduced to the circuit of Fig. 2*a*. In this circuit diode 3 is eliminated.

However, if one or the other types of synchronizing may be encountered at intervals, the circuit of Fig. 2 would be used, since it responds equally well to either of the above synchronizing methods.

Both circuits produce a single pulse of negative polarity as shown in Fig. 3, for each synchronizing pulse or pulses.

In one embodiment of Fig. 2 satisfactorily tried out in practice, the invention was used in an eight channel time division multiplex system wherein the synchronization period or time of each cycle of operation had a time duration of 100 microseconds. Adjacent channel pulses were spaced apart 11.1 micro-seconds. The radio frequency pulses were each about 0.4 micro-second long, and the clear time between extreme modulated conditions of adjacent channel pulses was about 3.1 micro-seconds. The spacing between synchronizing pulses was 1.5 $\mu$ sec.

It should be understood that the invention has other applications than in a time division multiplex system. For example, it may be used in an object detection system (sometimes referred to as radar) where the echo pulses have a certain time interval between them. Should an object suddenly appear at a very short distance from the apparatus, then the echo pulses would be very closely spaced in time from the transmitted pulses. The circuit of the invention could be made to respond to this spacing and the output used to set off an alarm.

The term "ground" used in the appended claims is obviously not limited to an actual earthed connection and is deemed to include any point of reference potential such as a point of zero radio frequency potential.

I claim:

1. A pulse selective system comprising a diode having a cathode and an anode, a condenser connected between said anode and ground, an input lead connected to said cathode for supplying negative polarity pulses thereto, a normally conducting triode having its grid connected to the anode of said diode and its cathode connected to ground, individual resistors connecting the grid and anode of said triode to the positive terminal of a source of unidirectional potential, a condenser connected between the anode of said triode and ground, said triode and last condenser forming a saw-tooth generator circuit, another triode normally biased to the anode current cut-off condition, a resistor connecting the anode of said last triode to said positive terminal, an output coupling condenser also connected to the anode of said last triode, and a connection from the grid of said last triode to the anode of said first triode.

2. A pulse selective system comprising a rectifier having a cathode and an anode, a condenser connected between said anode and ground, an input lead connected to said cathode for supplying negative polarity pulses thereto, a normally conducting grid-controlled vacuum tube having its grid connected to the anode of said rectifier and its cathode connected to ground, a resistor connecting the anode of said vacuum tube to the positive terminal of a source of unidirectional potential, means connected to said grid for supplying to said grid a potential which is positive relative to said cathode, a condenser connected between the anode of said vacuum tube and ground, said vacuum tube and last condenser forming a saw-tooth generator circuit, another grid-controlled vacuum tube normally biased to the anode current cut-off condition, a resistor connecting the anode of said last tube to said positive terminal, an output coupling condenser also connected to the anode of said last tube, and a connection from the grid of said last tube to the anode of said first tube.

3. A pulse selective system comprising a rectifier having a pair of electrodes, a condenser connected between one of said electrodes and ground, an input lead connected to said other electrode for supplying negative polarity pulses thereto, a normally conducting grid-controlled vacuum tube having its grid connected to said one electrode of said rectifier and its cathode connected to ground, means supplying potential of positive polarity to the anode of said vacuum tube through a resistor, means connected to said grid for supplying to said grid a potential which is positive relative to said cathode, a condenser connected between the anode of said vacuum tube and ground, said vacuum tube and last condenser forming a saw-tooth generator circuit, another grid-controlled vacuum tube normally biased to the anode current cut-off condition, a resistor connecting the anode of said last tube to said means for supplying a positive potential, an output coupling condenser also connected to the anode of said last tube, and a connection from the grid of said last tube to the anode of said first tube.

WILLIAM D. HOUGHTON.

REFERENCES CITED

The following references are of record in the file of this patent:

UNITED STATES PATENTS

| Number | Name | Date |
|---|---|---|
| 2,153,202 | Nichols | Apr. 4, 1939 |
| 2,281,934 | Geiger | May 5, 1942 |
| 2,287,926 | Zepler | June 30, 1942 |
| 2,359,447 | Seeley | Oct. 3, 1944 |